(12) United States Patent
Zeghlache

(10) Patent No.: US 11,675,105 B2
(45) Date of Patent: Jun. 13, 2023

(54) SYSTEM AND METHOD FOR CONFIGURING A LOGGING MODULE

(71) Applicant: SAUDI ARABIAN OIL COMPANY, Dhahran (SA)

(72) Inventor: Mohamed Larbi Zeghlache, Ash Sharqiyah (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 341 days.

(21) Appl. No.: 17/004,482

(22) Filed: Aug. 27, 2020

(65) Prior Publication Data

US 2022/0066066 A1    Mar. 3, 2022

(51) Int. Cl.
| | | |
|---|---|---|
| *G01V 11/00* | (2006.01) | |
| *E21B 17/10* | (2006.01) | |
| *E21B 47/08* | (2012.01) | |
| *E21B 47/12* | (2012.01) | |

(52) U.S. Cl.
CPC ........ *G01V 11/005* (2013.01); *E21B 17/1085* (2013.01); *E21B 47/08* (2013.01); *E21B 47/12* (2013.01); *E21B 2200/20* (2020.05)

(58) Field of Classification Search
CPC ... G01V 11/005; E21B 17/1085; E21B 47/08; E21B 47/12; E21B 2200/20
See application file for complete search history.

(56) References Cited

U.S. PATENT DOCUMENTS

| | | |
|---|---|---|
| 3,939,570 A | 2/1976 | Loftus |
| 3,968,568 A | 7/1976 | Jackson |
| 2004/0065446 A1* | 4/2004 | Tran ...................... E21B 43/105 166/207 |
| 2004/0223410 A1 | 11/2004 | West et al. |
| 2008/0164018 A1* | 7/2008 | Hall ..................... E21B 17/1057 166/241.1 |
| 2011/0222368 A1 | 9/2011 | Fussell |
| 2012/0175168 A1* | 7/2012 | Lee ........................ E21B 10/345 175/57 |
| 2016/0282504 A1* | 9/2016 | Wilson ................. E21B 47/002 |
| 2018/0245449 A1* | 8/2018 | Raffuzzi ................ G01B 5/207 |
| 2019/0063214 A1 | 2/2019 | Castillo |

FOREIGN PATENT DOCUMENTS

| | | |
|---|---|---|
| WO | 2014/131132 A1 | 9/2014 |
| WO | 2016057033 A1 | 4/2016 |
| WO | 2018/195009 A1 | 10/2018 |

OTHER PUBLICATIONS

International Search Report and Written Opinion of the International Searching Authority issued in corresponding International Application No. PCT/US2020/053420, dated Jul. 12, 2021 (17 pages).

* cited by examiner

*Primary Examiner* — David Z Huang
*Assistant Examiner* — Jean F Morello
(74) *Attorney, Agent, or Firm* — Osha Bergman Watanabe & Burton LLP

(57) ABSTRACT

A method for configuring a logging module for logging sensors deployment based on a sensing data acquisition objective includes selecting a tool body, selecting at least one type of sensor, and selecting at least one type of roller. The method also includes incorporating the at least one selected type of sensor onto the at least one selected type of roller to provide at least one sensor roller, and mounting the at least one sensor roller into a compressible mounting assembly provided in the tool body to provide the logging module.

15 Claims, 12 Drawing Sheets

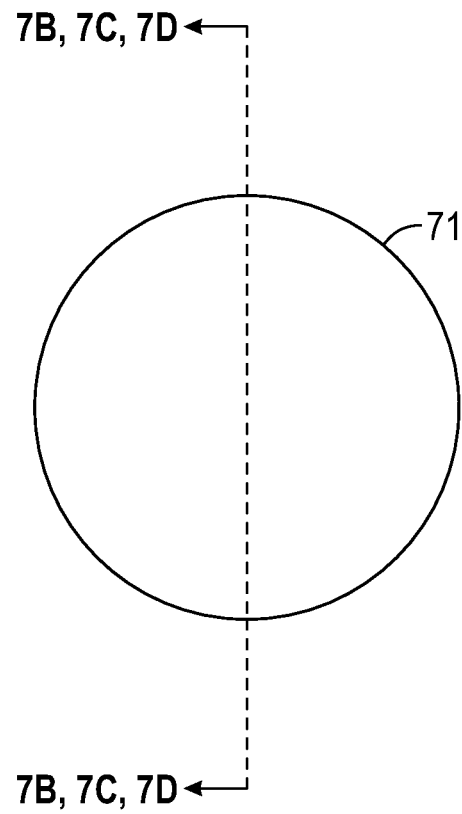
FIG. 7A
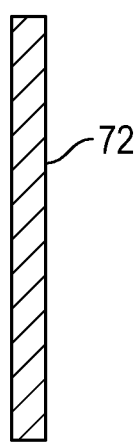 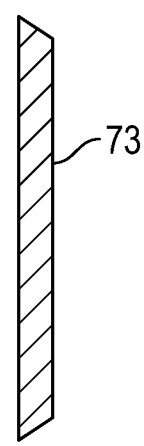 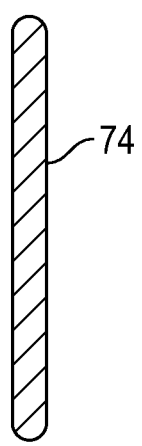
FIG. 7B  FIG. 7C  FIG. 7D

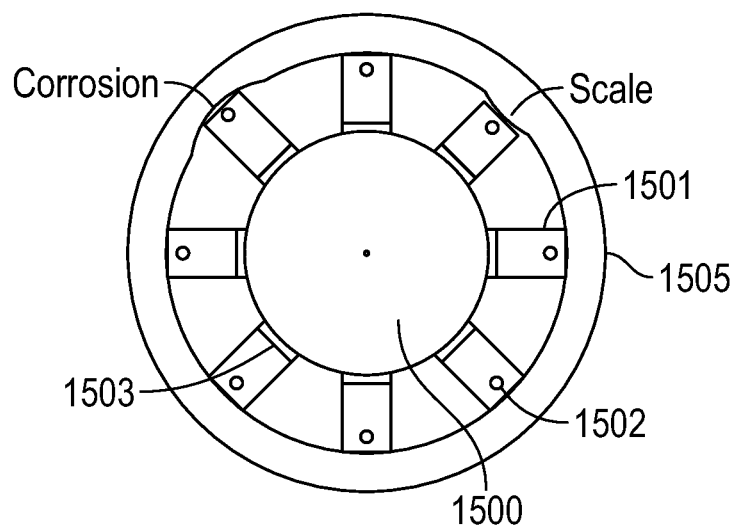
FIG. 15
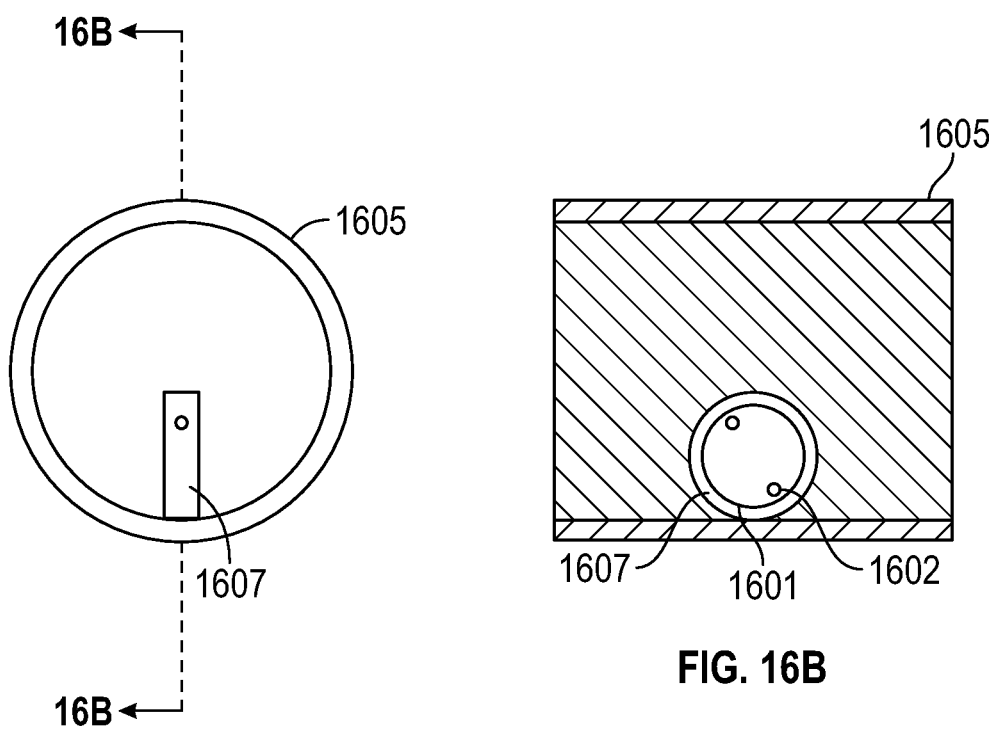
FIG. 16A
FIG. 16B

SYSTEM AND METHOD FOR CONFIGURING A LOGGING MODULE

BACKGROUND

Traditionally, wireline logging sensors and logging while drilling (LWD) logging sensors need direct contact with a formation to measure and collect various properties in a borehole. One common deployment of logging sensors is to mount the logging sensors on a tool body that is decentered using accessories such as bow spring or offset subs, so that the sensors contact with the formation under gravity. Another common deployment is to mount the logging sensors on pad devices or flappers that are deployed and extended mechanically away from the tool body using electric or hydraulic motors. However due to the rough and complex environment in the borehole, these traditional logging sensors deployments face challenges such as poor contact with the formation, poor data resolution, and high maintenance due to damage to the sensors.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

According to one aspect, embodiments relate to a method for configuring a logging module for logging sensors deployment based on a sensing data acquisition objective. The method may include selecting a tool body, selecting at least one type of sensor, and selecting at least one type of roller. The method may further include incorporating the at least one selected type of sensor onto the at least one selected type of roller to provide at least one sensor roller. The method may further include mounting the at least one sensor roller into a compressible mounting assembly provided in the tool body to provide the logging module.

According to another aspect, embodiments relate to a method that includes obtaining, by a computer processor, data from a plurality of logging operations using a logging module, the logging module comprising a plurality of sensors disposed on a plurality of rollers. The method may further include transmitting, by the computer processor, the obtained data into a model. The method may further include generating, by the computer processor and the model, an optimized logging module design using the obtained data. The obtained data may include logging module design parameters of the logging module and sensing data retrieved from the plurality of logging operations.

According to another aspect, embodiments disclosed herein relate to a logging module that includes a body having an outer surface, a plurality of rollers deployed on the body, each roller extending outwardly from the outer surface of the body, and a plurality of sensors disposed on the plurality of rollers. The logging module may further include a telemetry device in communication with the plurality of sensors.

Other aspects of the disclosure will be apparent from the following description and the appended claims.

BRIEF DESCRIPTION OF DRAWINGS

FIGS. 7A-7D show a perspective view and section views of rollers in accordance with one or more embodiments.
FIG. 15 shows an example of a logging module application in accordance with one or more embodiments.
FIGS. 16A and 16B show a front view and a right side section view of a logging module application in accordance with one or more embodiments.

DETAILED DESCRIPTION

Figure 1:
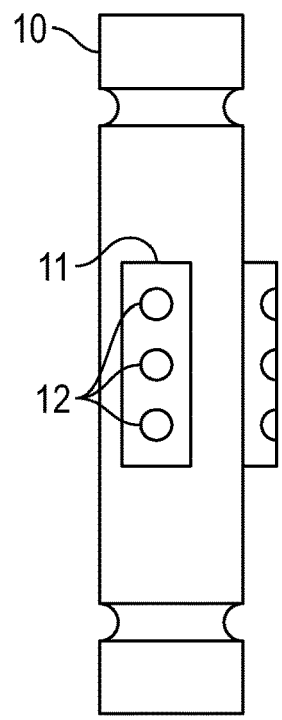
FIG. 1 shows an example of existing logging module.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element. The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include a logging module system and a method for configuring a logging module. In some embodiments, methods may include adopting various roller deployment modules and various types of sensors. For example, the various roller deployment modules may include an in-body roller module, wherein at least one roller is fixed inside a logging module body and extends from the logging module body, and at least one sensor is mounted on each roller. For another example, the various roller deployment modules may include an over-body roller module, wherein at least one roller is fixed on an outer surface of a logging module body and extends from the logging module body, and at least one sensor is mounted on each roller. Consequently, a new concept of logging sensors deployment on rollers is introduced.

Further, some embodiments of the disclosure provide a method for generating an optimized logging module design. More specifically, the optimized logging module design may be realized by a neural network. For example, various existing logging module design parameters and sensing data retrieved from existing logging operations may be collected and entered into the neural network. Correlations between the logging module design parameters and retrieved sensing data may be determined. As such, the optimized logging module designs may be generated by the neural network based on the known correlations.

Turning to FIG. 1, FIG. 1 shows an example of a traditional logging sensor deployment. As shown in FIG. 1, logging sensors (e.g., logging sensors 12) are mounted on pad devices (e.g., pad devices 11) that are attached to a tool body (e.g., tool body 10). Alternatively, the pad devices (11) may extend mechanically away from the tool body (10) (not shown). This traditional logging sensor deployment on pad devices faces challenges and disadvantages. For example, due to the rough condition and environment in the borehole, pad devices may suffer from corrosion, damage, or being lost, etc., and may have poor contact of the logging sensors to the borehole, which results in poor resolution. Moreover, in some cases, logging sensor deployment on pad devices requires complex conveyance system and higher maintenance. In order to solve these issues caused by the pad devices deployment, the disclosure provides a new concept of logging sensors deployed on rollers that will be further described below.

According to embodiments of the present disclosure, sensor rollers may be mounted along a tool body and configured in a manner to allow the sensor rollers to roll along a well wall (e.g., a borehole or a cased wall). As used herein, a sensor roller (may also be referred to as a "Sens&Roll") may refer to a roller having one or more sensors attached around an outer surface of the roller. As described more herein, rollers may be selected from different shapes and sizes that are capable of rotating with respect to an axis, and sensors may be selected from different types of sensors (e.g., depending on the type of data to be collected from the logging operation).

Figure 2:
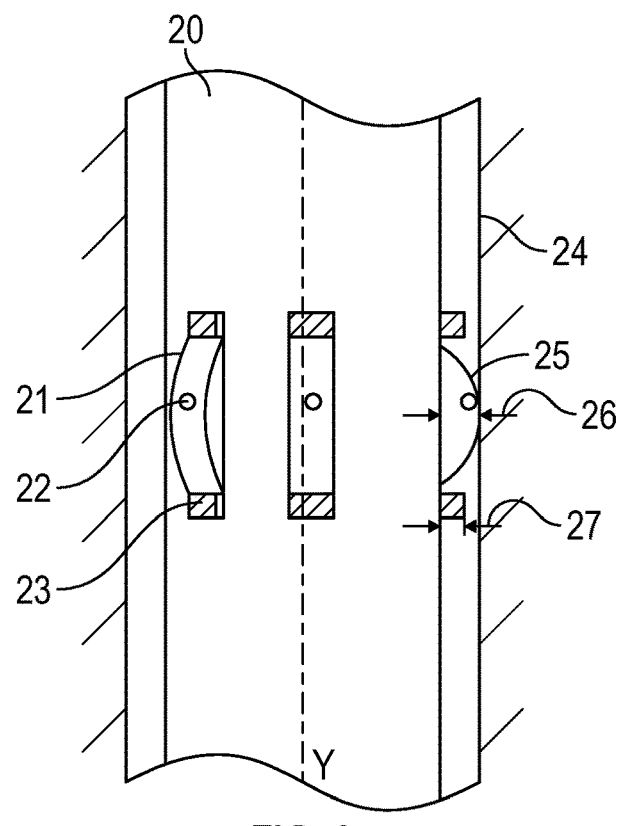
FIG. 2 shows a logging module in accordance with one or more embodiments.

Turning to FIG. 2, FIG. 2 provides an example of a logging module having sensor rollers deployed in an in-body sensor roller deployment configuration on a tool body in a borehole environment in accordance with one or more embodiments. The following example is for explanatory purposes only and not intended to limit the scope of the disclosed technology. As shown in FIG. 2, a plurality of rollers (e.g., roller 21) may be fixed inside a tool body (e.g., tool body 20) and extend from the tool body (20). A plurality of sensors (e.g., sensor 22) may be mounted on each of the plurality of rollers (21) to form sensor rollers (25). In addition, each of the sensor rollers (21) may be coupled with a pair of wear fins (e.g., wear fins 23) fixed on the tool body (20). The wear fins (23) may protrude a height (27) from the outer surface of the tool body, wherein the height (27) is less than a maximum extending distance (26) of the rollers (21), as measured perpendicularly from the outer surface of the tool body (20). The wear fins (23) may protect the rollers (21) and the sensors (22) from wear and damages as the tool body (20) passes through sharp edges of a borehole surface (e.g., borehole surface 24).

Figure 3A:
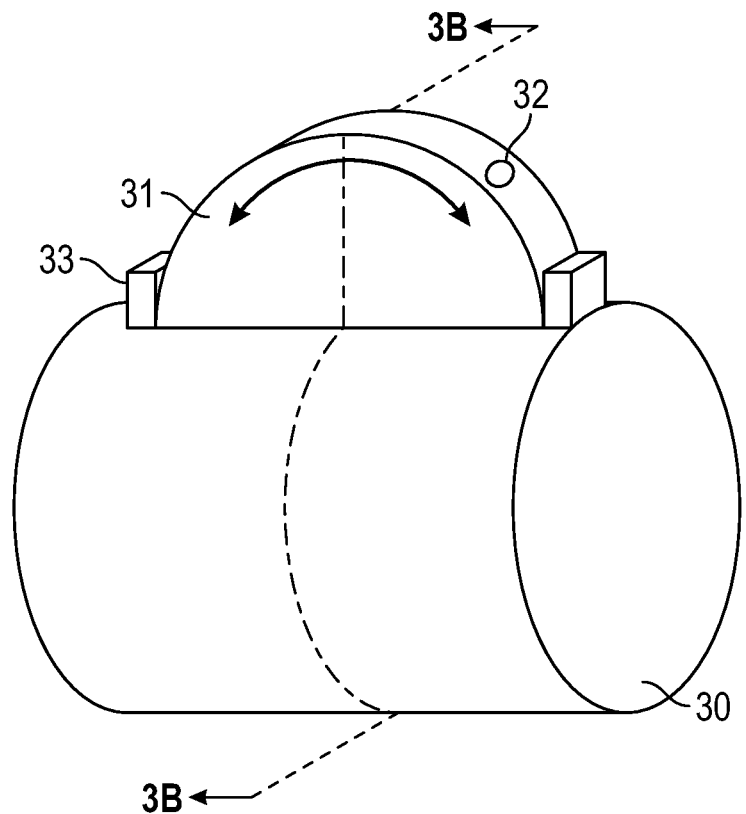
FIGS. 3A and 3B show a perspective view and a section view of a logging module in accordance with one or more embodiments.
Figure 3B:
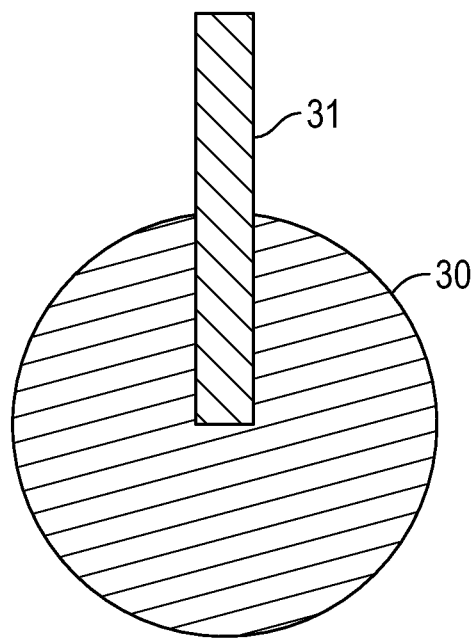

FIGS. 3A and 3B provide another example of an in-body sensor roller deployment module in accordance with one or more embodiments. As shown in FIGS. 3A and 3B, one roller (31) coupled with a pair of wear fins (33) may be fixed in a tool body (30) and partially extend from the tool body (20). At least one sensor (32) (e.g., one, two, three, or more sensors) may be mounted on the roller (31).

Figure 4A:
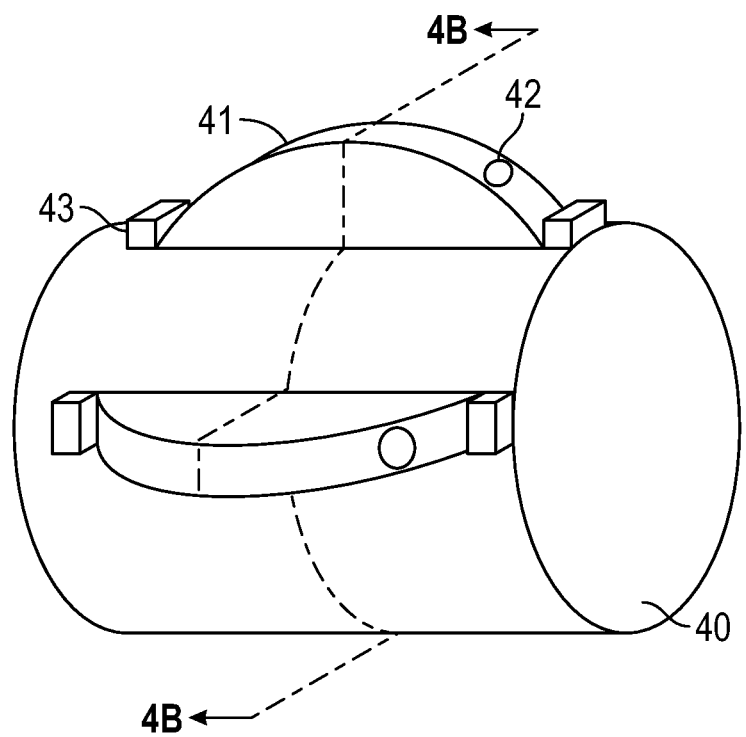
FIGS. 4A and 4B show a perspective view and a section view of a logging module in accordance with one or more embodiments.
Figure 4B:
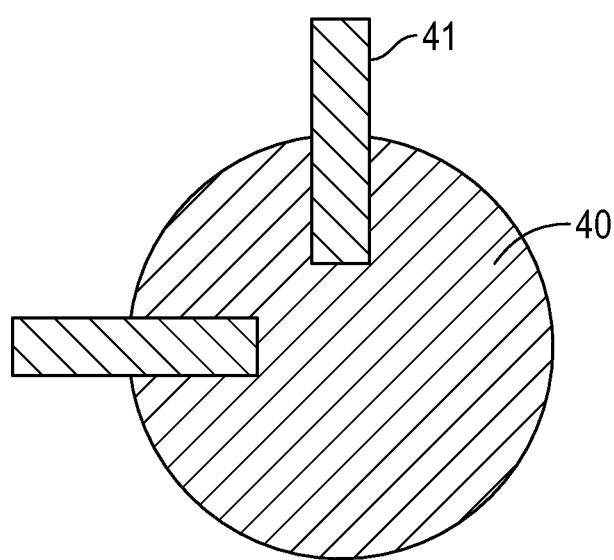

However, in-body sensor roller deployment is not limited to what is shown in FIGS. 2-3B. For example, as shown in FIGS. 4A and 4B, two rollers (41) each coupled with a pair of wear fins (43) may be fixed in the tool body (40) and partially extend from the tool body (40). The number of in-body sensor rollers that may be deployed on a logging tool body is not limited by the examples shown in FIGS. 2-4B, and may be selected, for example, based on logging operation parameters.

Figure 5:
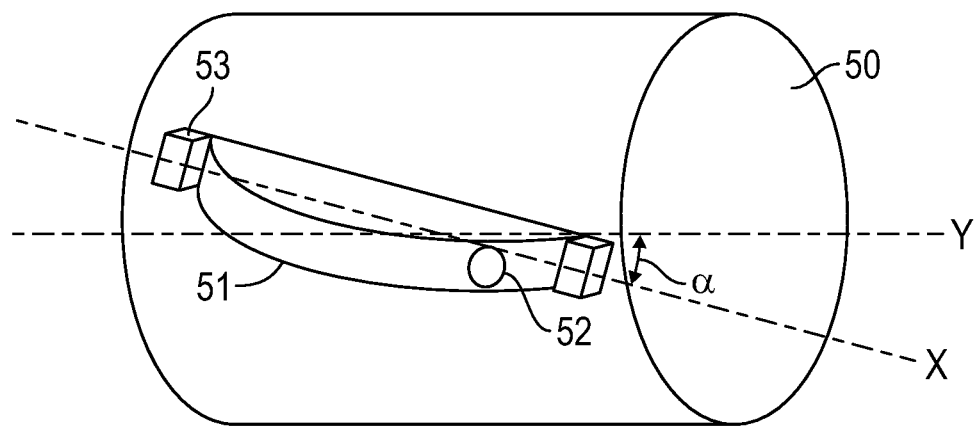
FIG. 5 shows a perspective view of a logging module in accordance with one or more embodiments.

Further, as shown in FIGS. 2-4B, the plurality of rollers (21, 31, 41) may extend from the tool body (20, 30, 40) perpendicularly to the tool body (20, 30, 40) surface and along a longitudinal axis Y of the tool body (20, 30, 40). In other embodiments, sensor rollers may be in a non-planar alignment with the longitudinal axis of the tool body. For example, FIG. 5 shows another example of an in-body sensor roller deployment module in accordance with one or more embodiments. As shown in FIG. 5, the plurality of rollers (51) may extend perpendicularly from the tool body (50) surface, and tilt at an angle (angle α in FIG. 5) from the longitudinal axis Y of the tool body (50). The angle α may be measured between a longitudinal axis X of the roller (51) and the longitudinal axis Y of the tool body (50) and may range from greater than 0° to 90°. In embodiments such as shown in FIG. 5, where the sensor roller tilts to form an angle between a longitudinal axis X of the roller and the longitudinal axis Y of the tool body, the sensor roller may rotate while the tool body swivels in a corkscrew motion. When logging modules are moved through a conduit in a corkscrew motion (e.g., such as when a drill string is rotated as it is moved axially through a well), a tilted sensor roller configuration may provide a higher vertical resolution compared to a configuration where the sensor roller does not tilt. Further, as the angle α increases (between 0° to 90°), the resolution may improve, but friction and operation complexity may also increase.

Figure 6A:
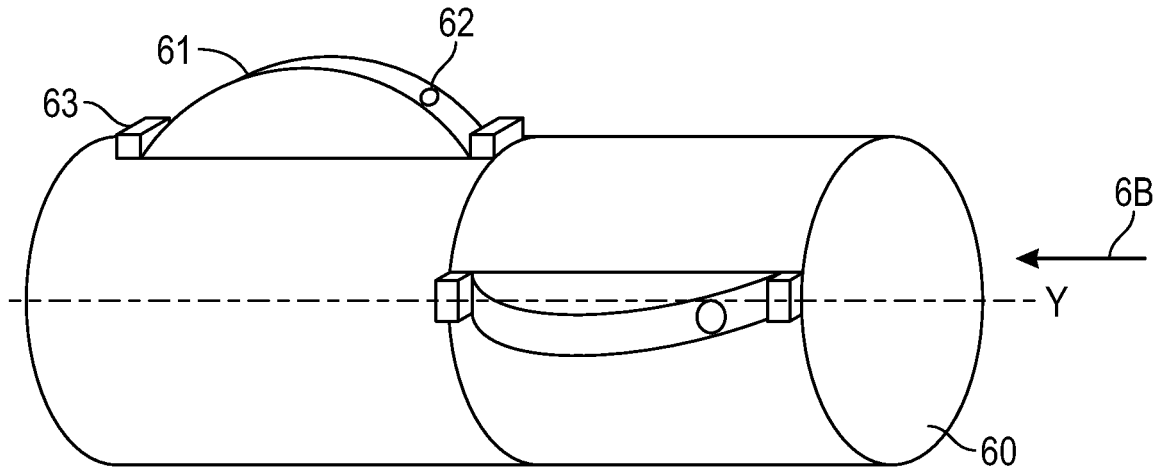
FIGS. 6A and 6B show a perspective view and a section view of a logging module in accordance with one or more embodiments.
Figure 6B:
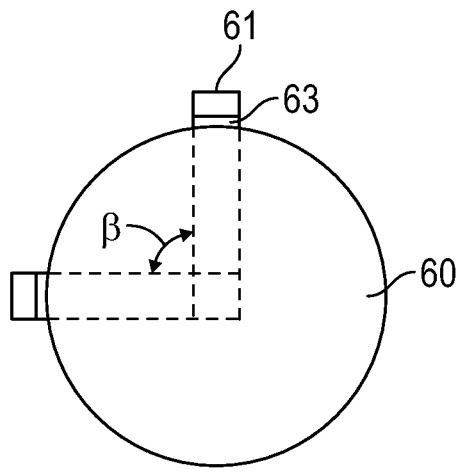

FIGS. 6A and 6B provide another example of an in-body sensor roller deployment module in accordance with one or more embodiments. Specifically, as shown in FIGS. 6A and 6B, two individual in-body sensor rollers are combined to provide an in-line tandem deployment with an offset angle (the angle β in FIG. 6B) of 90°. In some embodiments, the in-line tandem deployment may include more than two in-body sensor rollers, and the offset angle β may be larger than or equal to 0° and less than or equal to 180°. Further, the in-line tandem deployment is not limited by what is shown in FIGS. 6A and 6B. For example, each individual in-body sensor roller of the in-line tandem deployment may include a plurality of rollers deployed as shown in, but not limited to, FIGS. 2-5, and each of the plurality of rollers may include a plurality of sensors.

FIGS. 7A-7D show different designs of a roller (21, 31, 41, 51). For example, the roller (21, 31, 41, 51) may be a cylinder shape as shown in FIGS. 7A and 7B. The roller (21, 31, 41, 51) may be a frustum of a cone shape as shown in FIGS. 7A and 7C. In some embodiments, the roller (21, 31, 41, 51) may be a wheel shape having a sidewall with a convex profile, as shown in FIGS. 7A and 7D. However, the roller shape is not limited to these shapes.

Figure 8:
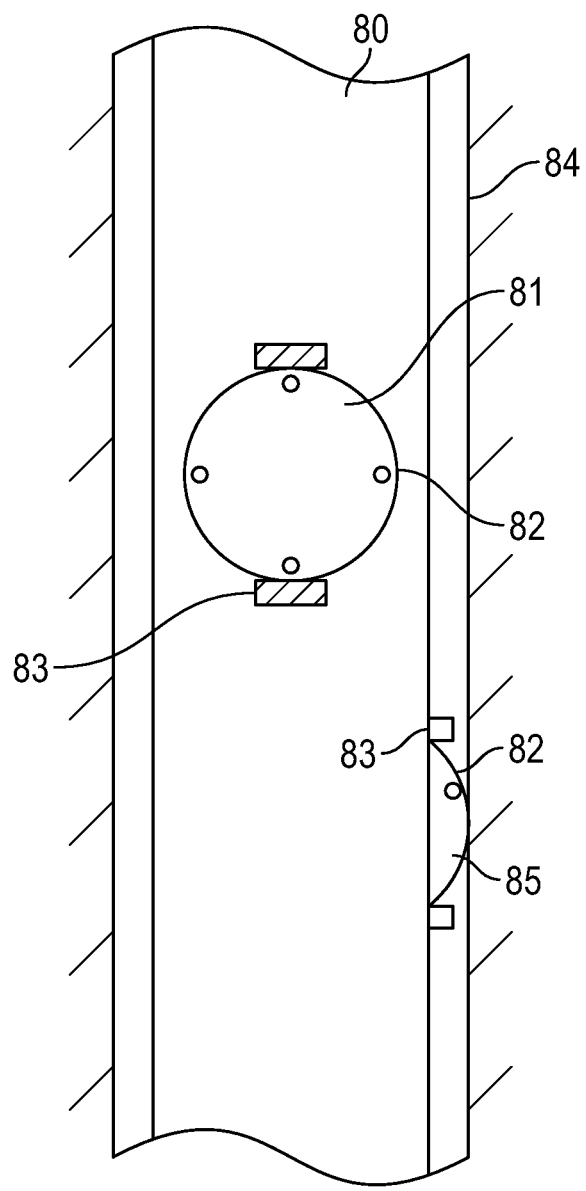
FIG. 8 shows a logging module in accordance with one or more embodiments.

Turning to FIG. 8, FIG. 8 provides an example of a logging module having sensor rollers attached to a tool body in an over-body deployment configuration in accordance with one or more embodiments. The following example is for explanatory purposes only and not intended to limit the scope of the disclosed technology. As shown in FIG. 8, a plurality of rollers (e.g. roller 81) may be mounted on the external surface of a tool body (e.g., tool body 80). Further, a plurality of sensors (e.g., sensor 82) may be mounted on each of the plurality of rollers (81) to form the sensor rollers (85). Similar to the in-body sensor rollers deployment, each of the plurality of rollers (81) of the over-body sensor rollers deployment may be coupled with a pair of wear fins (e.g., wear fins 83) fixed on the tool body (80). The wear fins (83) may aid in protecting the sensor rollers (85) as the logging module travels through a borehole (84).

Figure 9A:
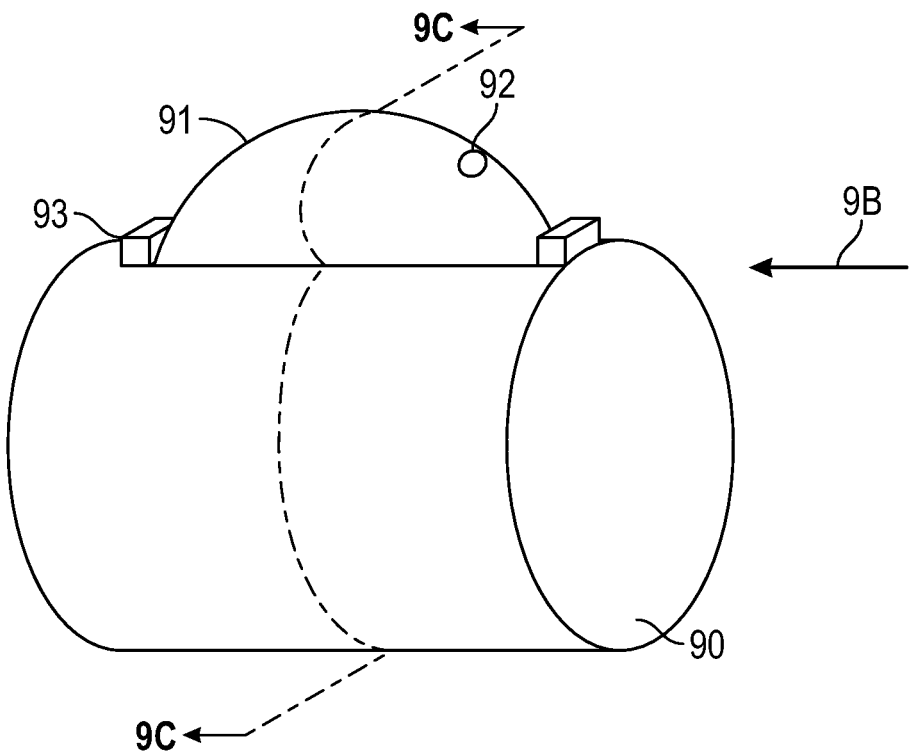
FIGS. 9A-9C show a perspective view and two section views of a logging module in accordance with one or more embodiments.
Figure 9B:
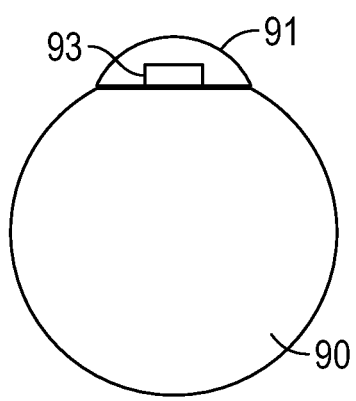
Figure 9C:
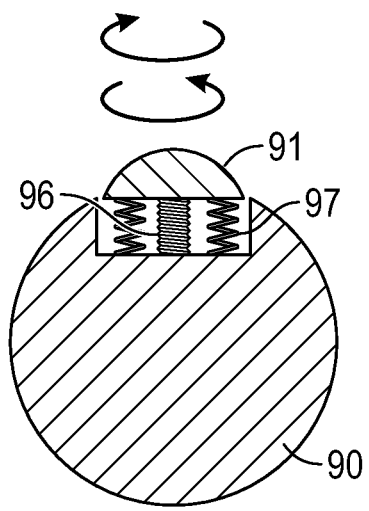

FIGS. 9A-9C provide another example of over-body sensor rollers in accordance with one or more embodiments. As shown in FIGS. 9A and 9B, one roller (91) coupled with a pair of wear fins (93) may be fixed on the outer surface of a tool body (90). At least one sensor (92) may be mounted on the roller (91). In some embodiments, as shown in FIG. 9C, the roller (91) may be mounted via a journal (e.g., journal 96) that is connected to the tool body (90). The journal (96) has the ability to axially move via a spring (97) to improve the flexibility of the roller (91), so that the roller may extend over the surface of the tool body (90) and/or move towards the tool body along the axis (96).

Figure 9D:
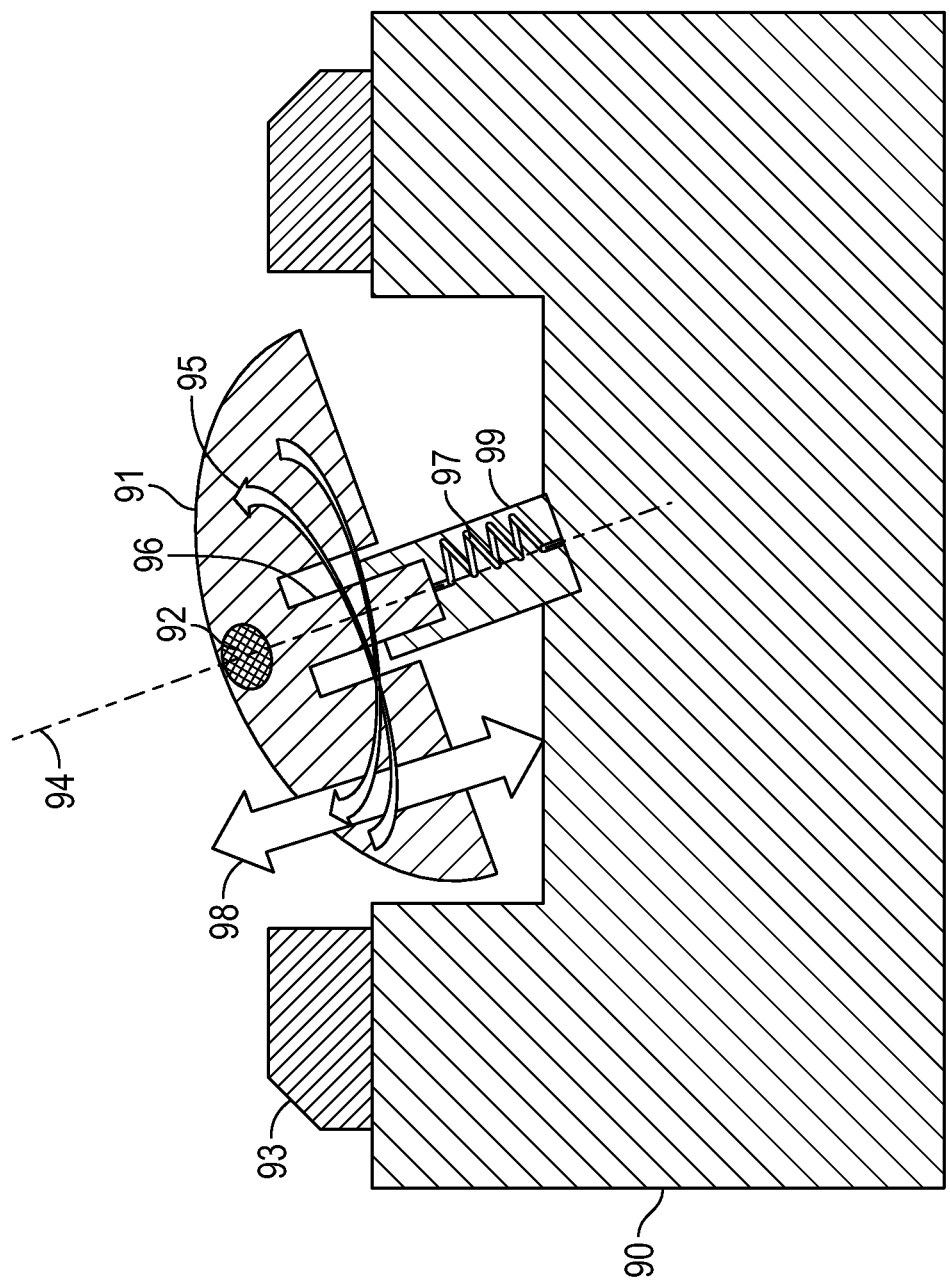
FIG. 9D shows a section view of a sensor roller mounted to a tool body at a non-perpendicular orientation in accordance with one or more embodiments.

FIG. 9D shows an alternative mounting configuration for a sensor roller rotatably mounted to a tool body (90) in an over-body deployment configuration. The tool body (90) may be, for example, a wall of a tubular (e.g., a drill string or BHA). As shown, the sensor roller includes a sensor (92) attached to a roller (91). The roller (91) has a hemispherical protruding portion shape and a journal (96) extending toward the tool body (90) from the protruding portion of the roller (91). The journal (96) may be co-axial with a central axis (94) of the roller (91). The journal (96) may be rotatably mounted to a compressible mounting assembly (99) on the tool body (90), such that the roller (91) may rotate (95) about its central axis (94).

The mounting assembly (99) may include, for example, a spring (97) or other type of force mechanism to provide the roller (91) with a limited amount of axial movement (98). In such manner, the sensor roller may be axially compressible/expandable (98) in a direction parallel with the central axis (94) of the roller (91). The mounting assembly (99) may further be oriented at an angle from a line perpendicular with the outer surface of the tool body (90). Thus, when the roller (91) is mounted to the mounting assembly (99), the roller (91) may also be oriented at an angle offset from a perpendicular orientation to the outer surface of the tool body (90). Once mounted, the sensor roller may be rotatable (95) about its central axis (94) and axially compressible/expandable (98) along a direction parallel with the central axis (94). Further, wear fins (93) may be mounted to the outer surface of the tool body (90) around the sensor roller.

Figure 10A:
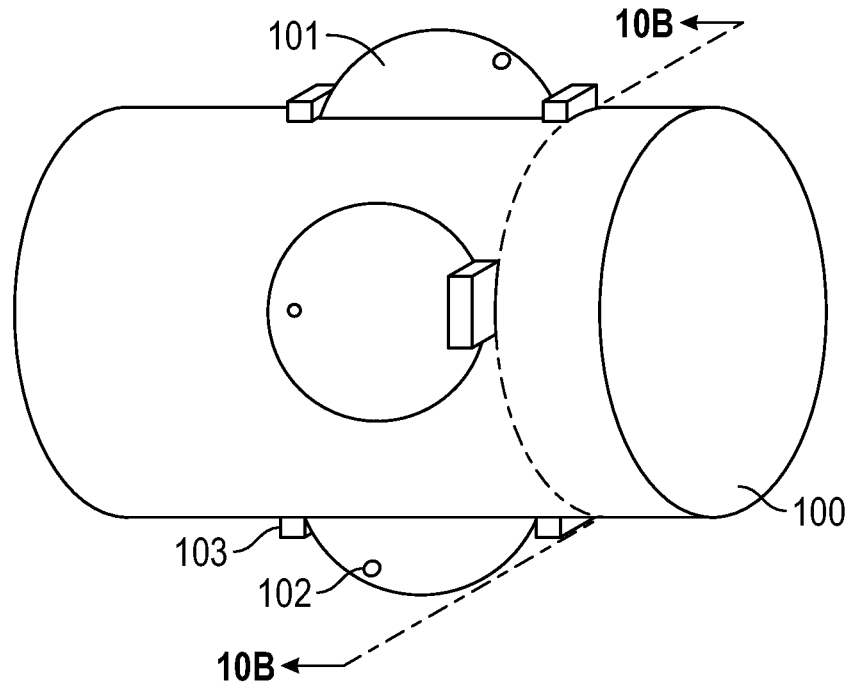
FIGS. 10A and 10B show a perspective view and a section view of a logging module in accordance with one or more embodiments.
Figure 10B:
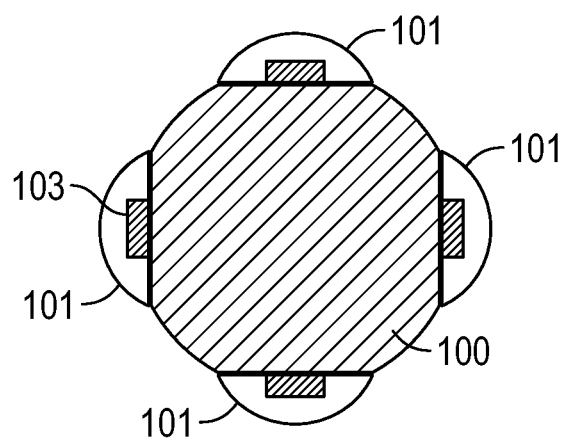
Figure 11:
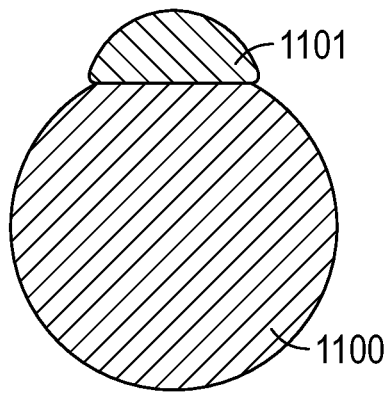
FIGS. 11-14 show section views of rollers in accordance with one or more embodiments.
Figure 12:
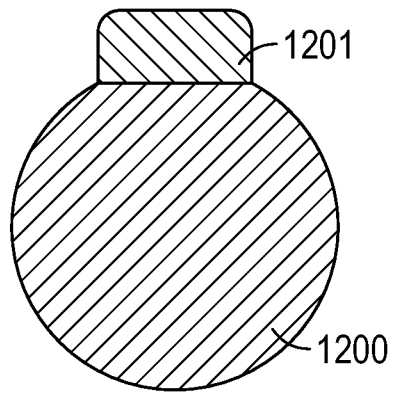
Figure 13:
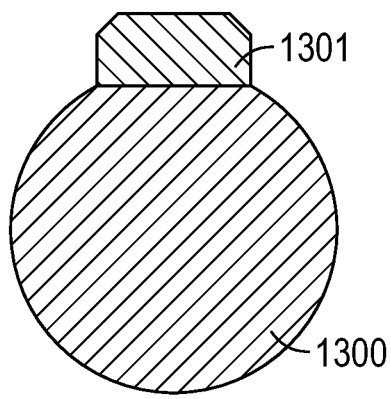
Figure 14:
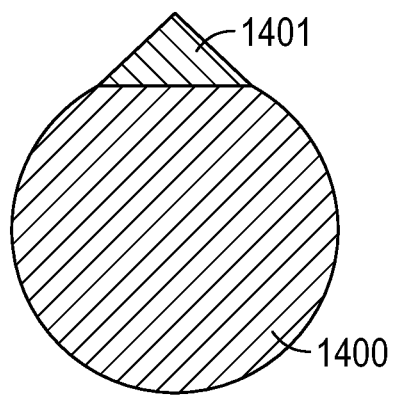

However, over-body sensor roller deployment is not limited to what is shown in FIGS. 8-9D. For example, as shown in FIGS. 10A and 10B, four sensor rollers (101) each having at least one sensor (102) and coupled with a pair of wear fins (103) may be fixed on the outer surface of a tool body (100). The number of sensor rollers in an over-body deployment is not limited by the examples shown in FIGS. 8-10B.

FIGS. 11-14 show section views of various designs of sensor rollers (1101, 1201, 1301, and 1401) on a tool body (1100, 1200, 1300, and 1400) in an over-body deployment configuration. However, the roller shape of the over-body sensor rollers is not limited to these shapes. For example, the roller shape may be flat, spherical, elliptical, conical, hemispherical, polyhedral, and etc., and the edge of the roller shape may be curved or sharped.

According to embodiments of the present disclosure, sensor rollers may have various shapes capable of rotating about an axis (for example, including a journal (96) in FIG. 9C). One or more sensors may be mounted on an outer surface of the roller, along a portion of the outer surface that may be contacted against a well wall when the sensor roller is rolled along the well wall.

For example, referring again to FIGS. 2 and 8, the rollers (21, 81) may contact and roll along an external surface (e.g., external surface 24 and 84), such as surface of a casing, a tubing, formation wall, or borehole wall, etc. In order to achieve flexible adherence, the rollers (21, 81) may be partially extendable slightly over the wear fins (23, 83) in a direction that is perpendicular to the tool body (20, 80). More specifically, the rollers (21, 81) may be mounted in a compressible mounting assembly and extend from the tool body (20, 80) under a passive system or active system in the compressible mounting assembly. A passive system, such as springs positioned within the tool body (20, 80), may be connected to each of the rollers (21, 81) and provide compressive force to each of the rollers. In some embodiments, one roller may be connected to one or more springs, either directly or through a journal. An active system, such as an electrical motor or a hydraulic motor, may provide controllable force to each of the rollers (21, 81).

For example, FIG. 15 shows a cross sectional view of a logging module having a plurality of sensor rollers (1501) in different radially compressed configurations as the logging module travels through a pipeline casing (e.g., pipeline casing (1505). As shown in FIG. 15, pipeline casing (e.g., pipeline casing 1505) may have corrosion and scale. When the logging module having the in-body sensor rollers (1501) is used for pipeline inspection, the sensor rollers (1501) may move slightly over the wear fins (e.g., wear fins 1503) to contact the corrosion of the pipeline casing (1505), and may move slightly towards the center of a tool body (e.g., tool body 1500) due to the pressure from scale of the pipeline casing (1505). Sensors (1502) may be provided along the outer surface of the rollers such that it may contact the pipeline casing (1505) as the logging module moves through the pipeline.

Further, keeping with FIGS. 2 and 8, in one or more embodiments, the tool body (20, 80) may refer to a part of a logging tool, which is a conveyance that carries the logging module. For example, the tool body (20, 80) may be a bottom hole assembly (BHA). A BHA may include a drill bit and one or more drill bit accessories, such as drill collar(s), stabilizer(s), a downhole motor, etc. and may be attached at the lowest part of a drill string. A drill string may include connected together drill pipes, drill collars, and drill bit (or BHA). A BHA may have various components and equipment that are designed to provide enough weight for the drill bit, and to direct the drill bit to a specific depth or move along a planned trajectory. Moreover, the tool body (20, 80) may be wireline, logging while drilling (LWD) tool, coil tubing, slickline, fiber line, etc.

In addition, in some embodiments, the logging modules may be utilized without a tool body. For example, for pipeline inspection, the logging module may be delivered to a target position in the pipeline via conveyance such as fluid flow. For another example, for downhole applications, the module may be delivered to a desired depth via motorized robot or weight ball dropping techniques. Sensors or part of the sensors may be positioned to always contact the external surface (24, 84), such as a casing/tubing inner wall and borehole wall, either directly, or indirectly. For example, as shown in FIGS. 16A and 16B, a sensor (e.g., sensor 1602) may contact an inner surface of a casing (e.g., casing 1605) through a magnet strip (e.g., magnet strip 1607). FIG. 16A shows an axial cross sectional view of the roller sensor contacting the inner surface of the casing (1605). FIG. 16B shows a cross sectional view along the axial length of the casing (1605) and a side view of the roller sensor, where the roller sensor includes multiple sensors (1602) disposed on an outer surface of a roller (1601) and a magnet strip (1607) wrapped around the outer surface of the roller.

While FIGS. 2-16 show various configurations of components, other configurations may be used without departing from the scope of the disclosure. For example, various components in FIGS. 2-16 may be combined to create a single component. As another example, functionality performed by a single component may be performed by two or more components.

In some embodiments, a plurality of sensor rollers can be directly supported by the tool body. Alternatively, a plurality of sensor rollers can be mounted on a sleeve or a pair of brackets, for example, the wear fins. Through the sleeve or the brackets, the plurality of sensor rollers may be mounted either tethered or untethered. A tethered configuration may refer to configurations where the plurality of sensor rollers are mechanically supported by the sleeve or the brackets, but are electrically connected to the tool body for communication and power purposes. An untethered configuration may refer to configurations that while the plurality of sensor rollers are mechanically supported on the sleeve or the brackets, the plurality of sensor rollers perform functions autonomously and communicate with the tool body through wireless communication. In the latter case, the tool body may provide convenient conveyance for the plurality of sensor rollers by reducing friction in the downhole, surface tubing, case casing, or borehole.

Moreover, in some embodiments, sensor rollers may be configured to be removable from the tool body. Further, in some embodiments, sensor rollers may be configured so that each of them is able to rotate continuously about its central axis. For example, the arrows in FIGS. 3A and 9C show possible rotation directions of the sensor rollers. Therefore, each sensor on the plurality of rollers may directly and equally contact the formation to achieve maximum coverage and contact on the formation surface. Further, in some embodiments, sensor rollers may be configured so that they have the ability to move slightly in directions perpendicular to the tool body and/or in directions that form acute angles with the outer surface of the tool body.

In some embodiments, one or more sensors may be mounted on the surface of one or more rollers. Alternatively, one or more sensors may be mounted inside one or more rollers. As such, the sensors may contact the external surface either directly or from a specific distance (from within a roller). Sensors may be miniaturized sensors that fit in a standard borehole size. For example, sensors may have a cylinder shape having a diameter between 3-5 inches and thickness of 1 inch. Furthermore, to achieve different objectives, sensors may be various types of sensors using different physics, including nuclear (e.g., gamma-ray sensor and Nuclear Magnetic Resonance (NMR) sensor), electrical sensors (e.g., resistivity sensor, dielectric sensor, and piezoelectric sensor), sonic sensors (e.g., ultrasonic sensor and seismic sensor), chemical sensors, electrochemical sensors, optical sensors, temperature sensors, pressure sensors, and etc.

In some embodiments, different numbers and types of sensors may be used strategically in various sensor rollers to achieve various logging and sensing objects. In some embodiments, same type of sensors with different measurement modes or sensing ranges may be deployed on the same roller. Further, one roller with more sensors may provide higher resolution, including vertical resolution and azimuthal resolution. For example, a roller having two sensors positioned around its circumference may provide double resolution (as the tool moves) compared to the same roller with one sensor only.

Embodiments of the disclosure may include a method of designing and/or configuring a logging module. For example, in some embodiments, a tool body, one or more rollers of various roller designs, and/or one or more types of sensors may be selected in order to configure the logging module in accordance with a pre-determined sensing data acquisition objective (e.g., to perform formation evaluation and to acquire a borehole profile, etc., in an open hole environment; and to perform cement evaluation, casing(s) inspection, production logging, well intervention, etc., in a cased hole environment). Further, the selected one or more sensors may be incorporated on the selected one or more rollers to form sensor rollers, and the one or more sensor rollers may be mounted onto the selected tool body to configure the logging module. In some embodiments, the tool body of the logging module may be selected based on an inner diameter of the well to be logged. For example, for a well or borehole with small inner diameter, a wire line that takes less space may be a better option compared with using a BHA tool as the tool body.

In addition, in some embodiments, a first configured logging module including a first set of sensor rollers may be used in a first logging operation. Afterwards, at least one of the first sensor rollers may be removed, and one or more second sensor rollers that are different from the removed first sensor rollers may be mounted in the mounting assembly that previously held the removed first sensor rollers. The second sensor rollers may have at least one sensor roller design parameter (e.g., roller design parameters such as size, material, and/or shape of roller, and/or sensor design parameters such as amount of sensors, wired/wireless communication design, and/or type of sensor) that is different from the first set of rollers and sensors. In such manner, a second logging module with a second set of sensor rollers may be configured and used for a second logging operation different than the first logging operation.

Keeping with the above description, the sensor roller design parameter may refer to various designs regarding the rollers and sensors, and logging module design parameters may refer to sensor roller design parameters as well as the design of additional logging module features. For example, logging module design parameters may include the number of rollers and sensors, roller shape, rollers and sensors deployment positions on the tool body, tool body type (e.g., tool body shape and size), and sensor data communication protocol (e.g., through one or more wireless transmitters or through a wire), etc. The sensor roller design parameters may also include, but not limited to, the design parameters shown in FIGS. 2-16 and described in the accompanying description.

While the various steps of the above method of configuring the logging module are described sequentially, one of ordinary skill in the art will appreciate that some or all of the steps may be executed in different orders, may be combined or omitted, and some or all of the steps may be executed in parallel. Furthermore, the steps may be performed actively or passively.

Embodiments of the disclosure may include a method of generating an optimized logging module design. The optimized logging module design may be realized using a neural network that includes a model. The neural network and the model will be further described below in FIG. 17 and the accompanying description.

Figure 17:
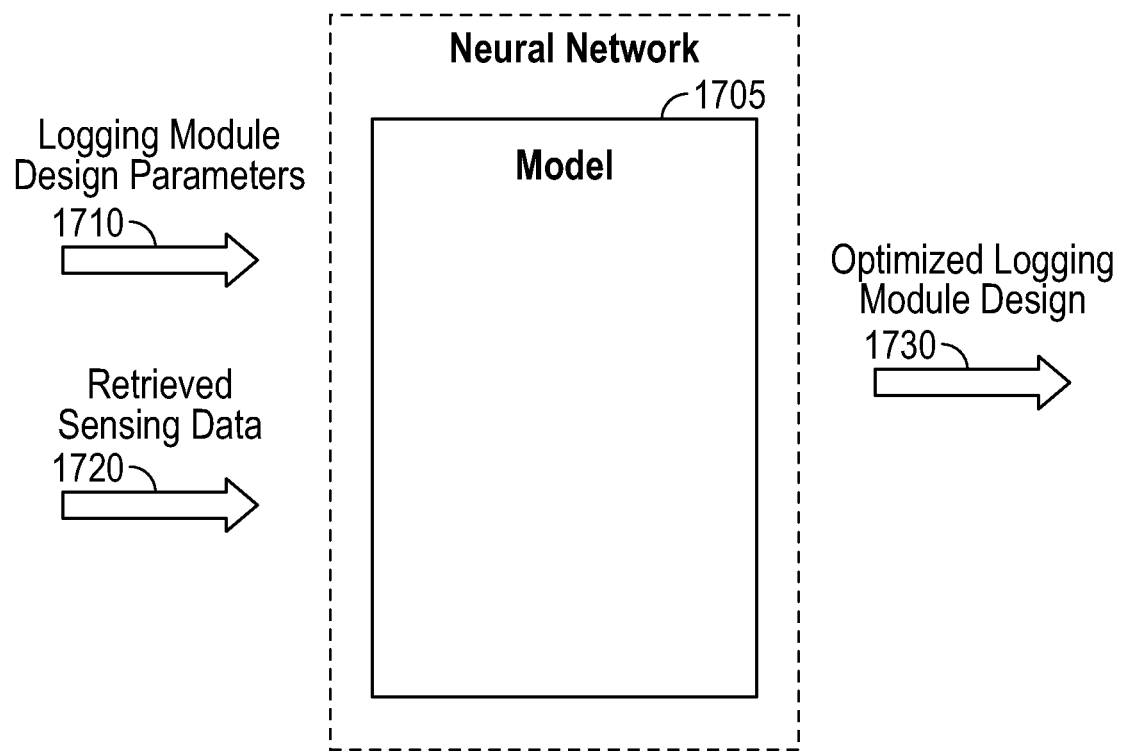
FIG. 17 shows a system in accordance with one or more embodiments.

Turning to FIG. 17, FIG. 17 provides an example of generating a model to use for generating an optimized logging module design. The following example is for explanatory purposes only and not intended to limit the scope of the disclosed technology. In FIG. 17, a model (e.g., model 1705) is trained for generating an optimized logging module design (e.g., optimized logging module design 1730). The model (1705) may obtain two inputs for training, i.e., logging module design parameters (e.g., logging module design parameters 1710) associated with an existing logging module, and retrieved sensing data (e.g., retrieved sensing data 1720) from a plurality of logging operations using the existing logging module. The retrieved sensing data (1720) may include various well parameters of a well (e.g., size of the borehole, if drilling fluid is present, etc.) for the plurality of logging operations.

As shown in FIG. 17, the output of the model (1705) may include the optimized logging module design (1730). Specifically, the model (1705) may be trained to compare the retrieved sensing data (1720) with a plurality of known well parameters of the well to determine a comparison result. The model (1705) may also be trained to adjust the logging module design parameters (1710) to generate the optimized logging module design (1730) based on the comparison result. Moreover, the optimized logging module design (1730) may be used for various of new logging operations to retrieve new sensing data. The optimized logging module design (1730) and the newly retrieved sensing data may be collected and inputted into the model (1705) in order to update the optimized logging module design (1730). For example, the optimized logging module design may include at least one of the sensor roller design parameters, as described above, a module conveyance parameter (including the type of tool body (e.g., a BHA) and/or conveyance method e.g., wireline, drill string, coiled tubing), and a data telemetry parameter (communication method between the sensors and data receivers, e.g., wired communication or wireless communication).

Figure 18:
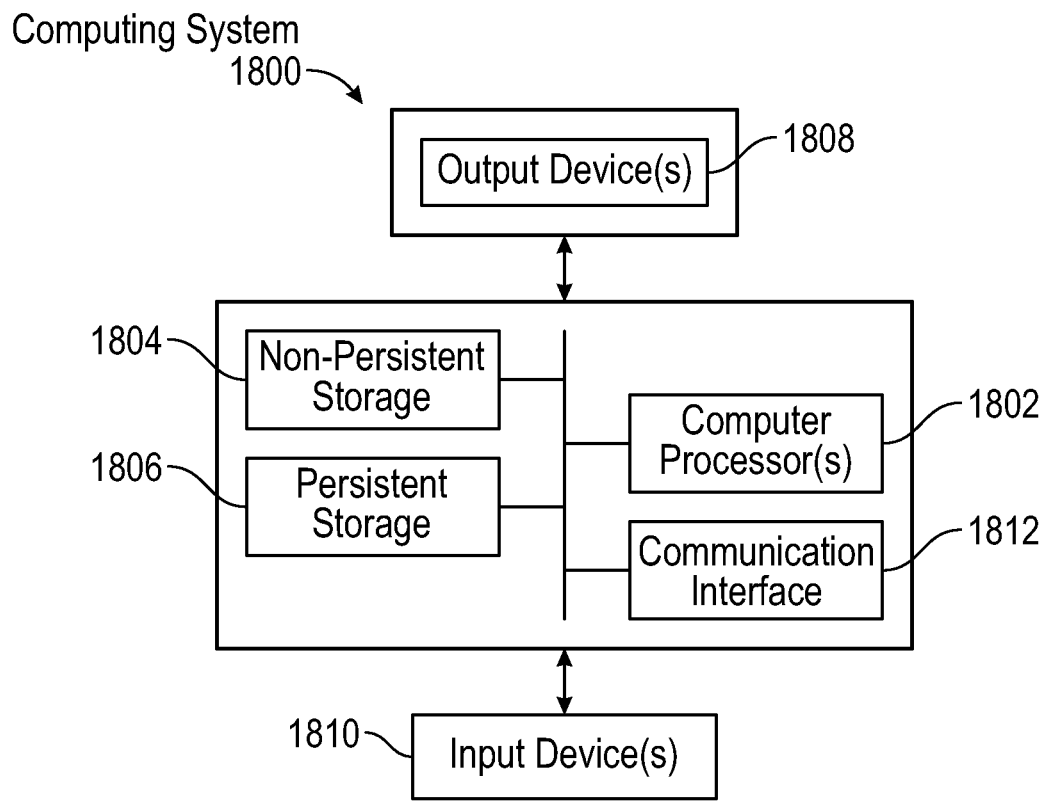
FIG. 18 shows a computing system in accordance with one or more embodiments.

Embodiments disclosed herein may be implemented on a computing system. Any combination of mobile, desktop, server, router, switch, embedded device, or other types of hardware may be used. For example, as shown in FIG. 18, the computing system (1800) may include one or more computer processors (1802), non-persistent storage (1804) (e.g., volatile memory, such as random access memory (RAM), cache memory), persistent storage (1806) (e.g., a hard disk, an optical drive such as a compact disk (CD) drive or digital versatile disk (DVD) drive, a flash memory, etc.), a communication interface (1812) (e.g., Bluetooth interface, infrared interface, network interface, optical interface, etc.), and numerous other elements and functionalities.

The computer processor(s) (1802) may be an integrated circuit for processing instructions. For example, the computer processor(s) may be one or more cores or micro-cores of a processor. The computing system (1800) may also include one or more input devices (1810), such as a touchscreen, keyboard, mouse, microphone, touchpad, electronic pen, or any other type of input device. In some embodiments, the computer processor(s) (1802) may have function to execute instructions to configure the optimized logging module design as described above in FIG. 17 and the accompanying description.

The communication interface (1812) may include an integrated circuit for connecting the computing system (1800) to a network (not shown) (e.g., a local area network (LAN), a wide area network (WAN) such as the Internet, mobile network, or any other type of network) and/or to another device, such as another computing device. In some embodiments, the communication interface (1812) may have the function to realize communication with the sensors, either via a wire or wirelessly.

Further, the computing system (1800) may include one or more output devices (1808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1802), non-persistent storage (1804), and persistent storage (1806). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure. In some embodiments, the software instructions may include instructions to perform generation of the optimized logging module design as described in FIG. 17 and the accompanying description.

The extracted data may be used for further processing by the computing system. For example, the computing system of FIG. 18, while performing one or more embodiments of the disclosure, may perform data comparison. Data comparison may be used to compare two or more data values (e.g., A, B). For example, one or more embodiments may determine whether $A>B$, $A=B$, $A\mathrel{!}=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if A=B or if A>B, as determined using the ALU. In one or more embodiments of the disclosure, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 18 may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases. In one or more embodiments, the data repository may be used to store retrieved sensing data, logging module design parameters, and well parameters, e.g., as described in FIG. 17 and the accompanying description.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 18 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model. In some embodiments, the functionality to present raw and/or processed data may be performed while generating an optimized logging module design, e.g., as described in FIG. 17 and the accompanying description.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 18. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method for configuring a logging module for logging sensors deployment based on a sensing data acquisition objective, comprising:
    selecting a tool body;
    selecting at least one type of sensor;
    selecting at least one type of roller;
    incorporating the at least one selected type of sensor onto the at least one selected type of roller to provide at least one sensor roller;
    mounting the at least one sensor roller into a compressible mounting assembly provided in the tool body to provide the logging module;
    using the logging module in a first logging operation;
    removing the at least one sensor roller from the tool body; and
    mounting at least one new sensor roller onto the tool body for a second logging operation, the at least one new sensor roller comprising at least one roller design parameter that is different from the removed sensor roller.

2. The method of claim 1, wherein the at least one sensor roller is deployed on the tool body and extends outwardly from an outer surface of the tool body.

3. The method of claim 1, wherein selecting the tool body comprises determining an inner diameter of a well to be logged.

4. A logging module, comprising:
    a body having an outer surface;
    a plurality of rollers deployed on the body, each roller extending outwardly from the outer surface of the body;
    a plurality of sensors disposed on the plurality of rollers; and
    a telemetry device in communication with the plurality of sensors,
    wherein the logging module is used in a first logging operation,
    wherein, subsequent to the first logging operation, a first roller of the plurality of rollers is removed from the body, and
    wherein, subsequent to removing the first roller, a second roller of the plurality of rollers is mounted onto the body for a second logging operation, the second roller comprising at least one roller design parameter that is different from the removed first roller.

5. The logging module of claim 4, further comprising a plurality of pairs of wear fins mounted around the plurality of rollers on the outer surface of the body, wherein the wear fins protrude from the outer surface of the body.

6. The logging module of claim 4, further comprising a compressible mounting assembly connecting the plurality of rollers to the body.

7. The logging module of claim 6, wherein the compressible mounting assembly comprises springs positioned within the body and connected to each of the plurality of rollers.

8. The logging module of claim 6, wherein the compressible mounting assembly comprises an electric motor or a hydraulic motor.

9. The logging module of claim 4, wherein the plurality of rollers rotates continuously by its center axle.

10. The logging module of claim 4, wherein the plurality of rollers are fixed inside the body.

11. The logging module of claim 4, wherein the plurality of rollers are fixed on the outer surface of the body.

12. The logging module of claim 4, wherein each of the plurality of rollers has a shape selected from conical, hemispherical, and polyhedral.

13. The logging module of claim 4, wherein the plurality of rollers are removable from the body.

14. The logging module of claim 4, wherein the plurality of sensors communicate with the telemetry device wirelessly.

15. The logging module of claim 4, wherein the plurality of rollers are equally spaced around an outer diameter of the body.

* * * * *

UNITED STATES PATENT AND TRADEMARK OFFICE
CERTIFICATE OF CORRECTION

| | |
|---|---|
| PATENT NO. | : 11,675,105 B2 |
| APPLICATION NO. | : 17/004482 |
| DATED | : June 13, 2023 |
| INVENTOR(S) | : Mohamed Larbi Zeghlache |

It is certified that error appears in the above-identified patent and that said Letters Patent is hereby corrected as shown below:

On the Title Page

At (12), the name "Zeghlache" should read -- Larbi Zeghlache --

Signed and Sealed this
Thirtieth Day of July, 2024

Katherine Kelly Vidal
*Director of the United States Patent and Trademark Office*